US008876181B1

(12) United States Patent
Roberts et al.

(10) Patent No.: US 8,876,181 B1
(45) Date of Patent: Nov. 4, 2014

(54) OBJECT TRANSPORT DEVICE

(71) Applicant: Innovision Developers, LLC, Arlington, VT (US)

(72) Inventors: Jonathan Whitney Roberts, Arlington, VT (US); Lynne Marie Roberts, Arlington, VT (US)

(73) Assignee: Innovision Developers, LLC, Arlington, VT (US)

( * ) Notice: Subject to any disclaimer, the term of this patent is extended or adjusted under 35 U.S.C. 154(b) by 0 days.

(21) Appl. No.: 14/270,702

(22) Filed: May 6, 2014

Related U.S. Application Data

(60) Provisional application No. 61/823,432, filed on May 15, 2013, provisional application No. 61/863,011, filed on Aug. 7, 2013.

(51) Int. Cl.
*B65G 7/12* (2006.01)

(52) U.S. Cl.
CPC ....................................... *B65G 7/12* (2013.01)
USPC ............................................ 294/17; 254/131

(58) Field of Classification Search
CPC .............. B65G 7/02; B65G 7/08; B65G 7/10; B65G 7/12; B66F 15/00; B66F 19/005; B27B 17/0075
USPC ............ 294/4, 11, 13, 17, 19.3, 26, 175, 191, 294/104, 50.9; 254/131
See application file for complete search history.

(56) References Cited

U.S. PATENT DOCUMENTS

| | | | | |
|---|---|---|---|---|
| 437,080 | A | * | 9/1890 | Ayers .............................. 294/17 |
| 1,829,490 | A | * | 10/1931 | Parrish ........................... 294/17 |
| 2,539,231 | A | * | 1/1951 | Davis .............................. 254/94 |
| 2,733,895 | A | * | 2/1956 | Trenkle ......................... 254/131 |
| 3,310,331 | A | | 3/1967 | Michaud |
| 4,087,077 | A | * | 5/1978 | Vance ............................. 254/94 |
| D265,375 | S | | 7/1982 | Alvarez |
| 4,364,592 | A | | 12/1982 | Jackson |
| 4,368,874 | A | * | 1/1983 | Weisgerber ................... 254/131 |
| 4,433,829 | A | * | 2/1984 | Grover et al. ................. 254/131 |
| 4,449,743 | A | | 5/1984 | Pankratz |
| 4,533,117 | A | * | 8/1985 | Schwang ........................ 254/94 |
| 4,583,904 | A | * | 4/1986 | Maxwell ....................... 414/453 |
| 4,955,647 | A | | 9/1990 | Alfredson |
| 7,131,676 | B2 | * | 11/2006 | Hoff ............................... 294/17 |
| D568,123 | S | | 5/2008 | Bantle |
| D651,059 | S | | 12/2011 | McDonald |
| 2007/0046049 | A1 | * | 3/2007 | Gale et al. ....................... 294/16 |

* cited by examiner

*Primary Examiner* — Dean Kramer
(74) *Attorney, Agent, or Firm* — Jason L. Gilbert

(57) ABSTRACT

An object transport device which aids in the lifting, carrying, and transport of objects such as logs. The object transport device generally includes a grasping assembly which includes a handle and a pivotally secured hook adapted to extend around and retain an object such as a log. An optional cant extension is provided which may be removably secured to the grasping assembly to convert the present invention into a conventional cant hook configuration. A lifter adapter is also provided which may be removably secured to the grasping assembly. The lifter adapter may removably receive a T-shaped lifter extension to convert the present invention into a conventional timber jack configuration which aids in lifting and supporting larger or heavier objects.

16 Claims, 14 Drawing Sheets

OBJECT TRANSPORT DEVICE

CROSS REFERENCE TO RELATED APPLICATIONS

I hereby claim benefit under Title 35, United States Code, Section 119(e) of U.S. provisional patent application Ser. No. 61/823,432 filed May 15, 2013. The 61/823,432 application is hereby incorporated by reference into this application.

I hereby claim benefit under Title 35, United States Code, Section 119(e) of U.S. provisional patent application Ser. No. 61/863,011 filed Aug. 7, 2013. The 61/863,011 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a transport device for objects and more specifically it relates to an object transport device which aids in the lifting, carrying, and transport of objects such as logs.

2. Description of the Related Art

Any discussion of the related art throughout the specification should in no way be considered as an admission that such related art is widely known or forms part of common general knowledge in the field.

It is often difficult to easily transport objects such as logs. For example, when cutting and collecting firewood, an individual is often forced to either manually carry a heavy log or cut the heavy log into numerous smaller pieces that require multiple trips from the cutting site to the drop-off site.

While tools such as cant hooks exist to aid in rolling logs from one location to another, such tools are extremely limited in application. While the cant hook can be used to roll a log, it is far less efficient for carrying and transporting a log, such as in areas where an unimpeded path for rolling may not be present (i.e. a dense forest). Other log lifting apparatuses are similarly limited in their functionality, often requiring multiple tools for transport of differently-sized logs.

Because of the inherent problems with the related art, there is a need for a new and improved object transport device which aids in the lifting, carrying, and transport of objects such as logs. The present invention reduces the degree to which the user needs to bend over to lift an object such as a log when transporting it. This reduces the strain on the user's back and makes lifting easier and faster. The degree of bending is reduced by 45-50%. As such, the tool improves the overall ergonomics of accomplishing the work.

BRIEF SUMMARY OF THE INVENTION

The invention generally relates to an object transport device which includes a grasping assembly which includes a handle and a pivotally secured hook adapted to extend around and retain an object such as a log. An optional cant extension is provided which may be removably secured to the grasping assembly to convert the present invention into a conventional cant hook configuration. A lifter adapter is also provided which may be removably secured to the grasping assembly and which is adapted to removably receive a T-shaped lifter extension to aid in lifting larger or heavier objects.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
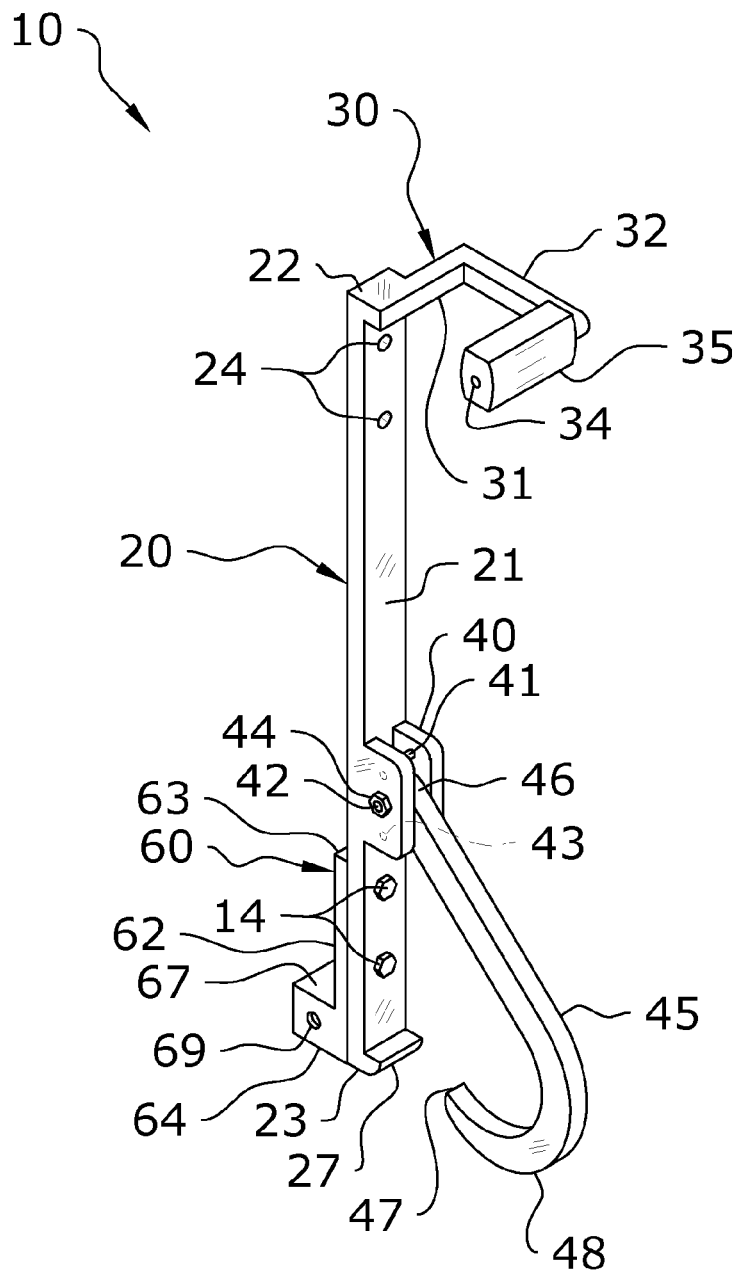
FIG. 1 is a frontal upper perspective view of the present invention with the lifter adapter attached.

Turning now descriptively to the drawings, in which similar reference characters denote similar elements throughout the several views, FIGS. 1 through 13 illustrate an object transport device 10, which comprises a grasping assembly 20 which includes a handle 35 and a pivotally secured hook 45 adapted to extend around and retain an object 12 such as a log. An optional cant extension 50 is provided which may be removably secured to the grasping assembly 20 to convert the present invention into a conventional cant hook configuration. A lifter adapter 60 is also provided which may be removably secured to the grasping assembly 20 and which is adapted to removably receive a T-shaped lifter extension 70 to aid in lifting larger or heavier objects 12 off the ground.

B. Grasping Assembly

The grasping assembly 20 comprises the core of the present invention to which the optional cant extension 50 and lifter adapter 60 may be removably attached. The grasping assembly 20 is adapted to, by itself, aid in the lifting and transport of objects 12 such as logs. The figures illustrate an exemplary embodiment of the grasping assembly 20, though it should be appreciated that variations of the shape, size, and configuration of the grasping assembly 20 may be included to accommodate different types of objects 12 or uses for the present invention.

As best shown in FIG. 1, the grasping portion 20 comprises a body portion 21 having a first end 22 and a second end 23. The handle 35 generally extends from the first end 22 of the body portion 21 while the hook 45 extends adjacent to the body portion's 21 second end 23. The first end 22 of the body portion 21 is adapted to act as a mount for a removably secured cant extension 50. Similarly, the second end 23 of the body portion 21 is adapted to act as a mount for a removably lifter extension 60 as described herein.

The body portion 20 is generally comprised of an elongated member such as shown in the figures. The body portion 20 may be comprised of various other shapes, sizes and configurations. Thus, the length, configuration, and general shape of the body portion 20 shown in the exemplary figures should not be construed as limiting. In the exemplary embodiment shown in the figures, the body portion 20 comprises a flat bar-like elongated member. The length of the body portion 20 may vary for different purposes or for different types of users.

Figure 3:
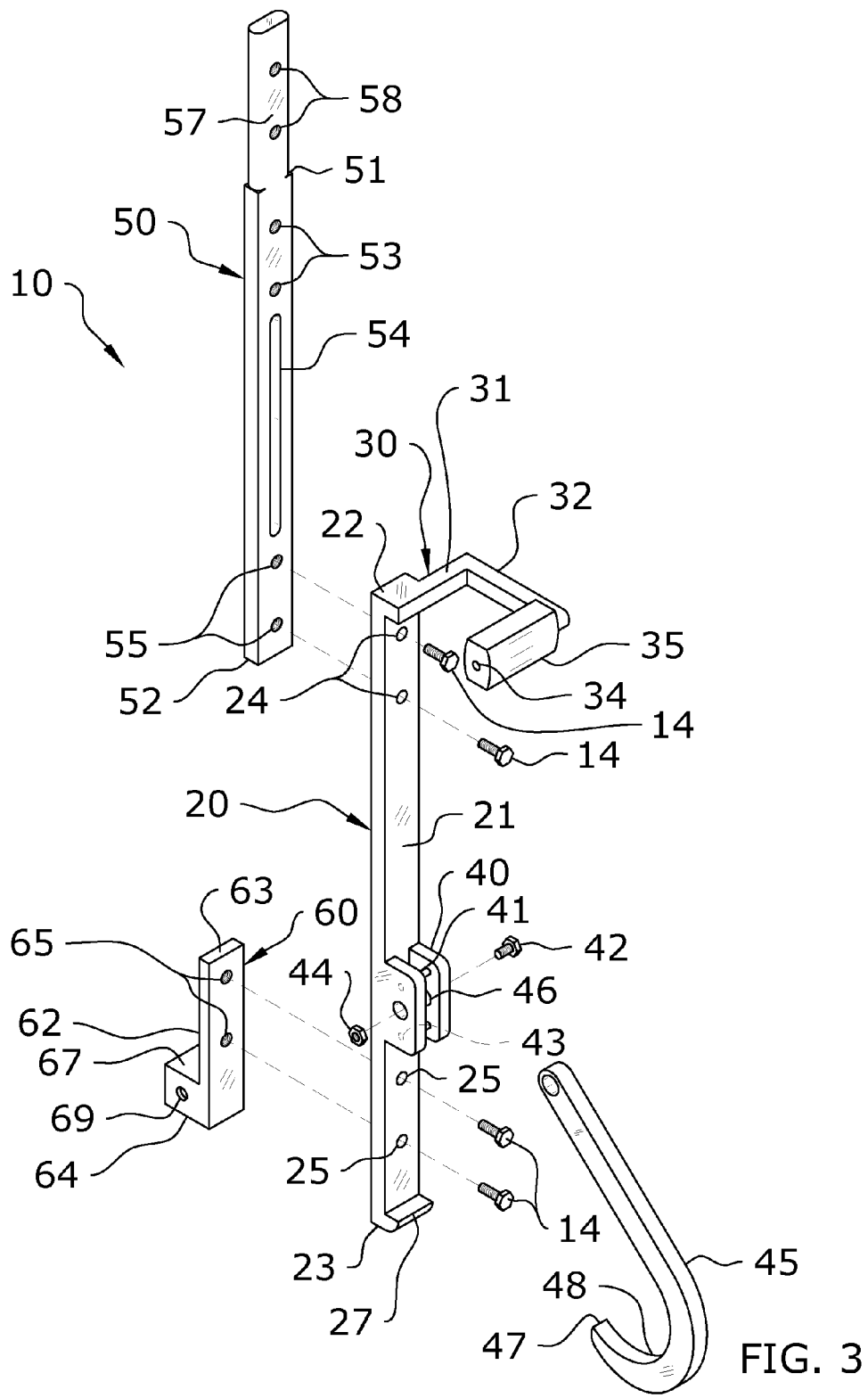
FIG. 3 is an exploded view of the present invention including the lifter adapter and cant extension.

The first end 22 of the body portion 21 of the grasping assembly 20 will generally include one or more first body mounts 24 which are utilized to removably secure the cant extension 50 to the grasping assembly 20 such as shown in FIG. 3. In the embodiment shown in the figures, the first body mounts 24 comprise a pair of apertures positioned adjacent to the first end 22 of the body portion 21 through which fasteners 14 may be selectively inserted to removably secure the cant extension 50 to the first end 22 of the body portion 21.

While the figures illustrate that the first body mounts 24 comprise such an arrangement of apertures, it is appreciated that in some embodiments a single aperture may be utilized. Alternate structures other than the aperture/fastener combination shown herein may also be utilized to removably secure the cant extension 50 to the first end 22 of the body portion 21.

The second end 23 of the body portion 21 of the grasping assembly 20 will generally include one or more second body mounts 25 which are utilized to removably secure the lifter adapter 60 to the grasping assembly 20 such as shown in FIG. 3. In the embodiment shown in the figures, the second body mounts 25 comprise a pair of apertures positioned adjacent to the second end 23 of the body portion 21 through which fasteners 14 may be selectively inserted to removably secure the lifter adapter 60 to the second end 23 of the body portion 21.

While the figures illustrate that the second body mounts 25 comprise such an arrangement of apertures, it is appreciated that in some embodiments a single aperture may be utilized. Alternate structures other than the aperture/fastener combination shown herein may also be utilized to removably secure the lifter adapter 60 to the second end 23 of the body portion 21.

As shown throughout the figures, the grasping assembly 20 may include a claw 27 extending from the second end 23 of the body portion 21. The claw 27 comprises a flange or other abutment which extends off one side of the second end 23 of the body portion 21. The claw 27 will act in conjunction with the hook 45 to aid in grasping and carrying an object 12 such as a log with the grasping assembly 20.

Figure 2:
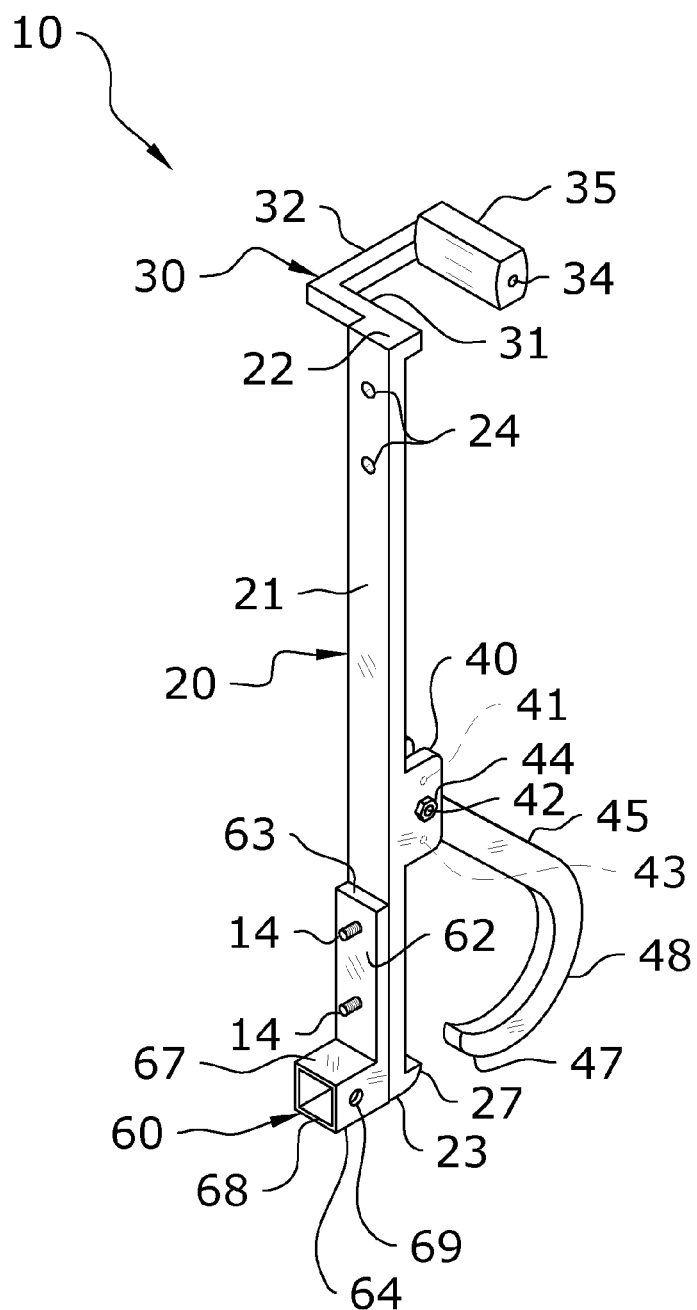
FIG. 2 is a rear upper perspective view of the present invention with the lifter adapter attached.

As best shown in FIGS. 1 and 2, the grasping assembly 20 includes a handle support 30 and handle 35 extending from first end 22 of the body portion 21. The handle support 30 comprises an elongated member or connector which extends perpendicularly with respect to the body portion 21. The spacing offset of the handle 35 provided by the handle support 30 increases the leverage and efficiency of the present invention for grasping and transporting objects 12 such as logs.

The handle support 30 may comprise a single elongated member or may comprise a first portion 31 and second portion 32 as shown in the figures. The first portion 31 extends in a first direction while the second portion 32 extends at a right angle with respect to the first portion 31. As best shown in FIG. 1, the handle 35 extends outwardly from the second portion 32 perpendicularly with respect to the second portion 32 and parallel with respect to the first portion 31 in a preferred embodiment. Various other configurations may be utilized.

The handle support 30 generally includes a pin 34 at its distal end as best shown in FIG. 1. The pin 34 is utilized to secure a handle 35 to the handle support 30 to ease use of the grasping assembly 20 for carrying and transporting objects 12. Various handle configurations may be utilized including ergonomic handle configurations. Thus, the scope of the present invention should not be construed as limited by the exemplary handle configuration shown in the figures.

The handle 35 is preferably positioned above the hook 45 but offset in a horizontal direction from the body portion 21, extending in a direction which is perpendicular with respect to the body portion 21. Without such an offset, the efficiency of hooking and grabbing of an object 12 will be greatly reduced to less than 100% and closer to 30-50% efficiency. Efficiency in this case means the number of positive object 12 grabs and lifting with regards to total attempts. Thus, the handle 35 will preferably be vertically aligned with the hook 45 as shown in the figures.

Figure 9:
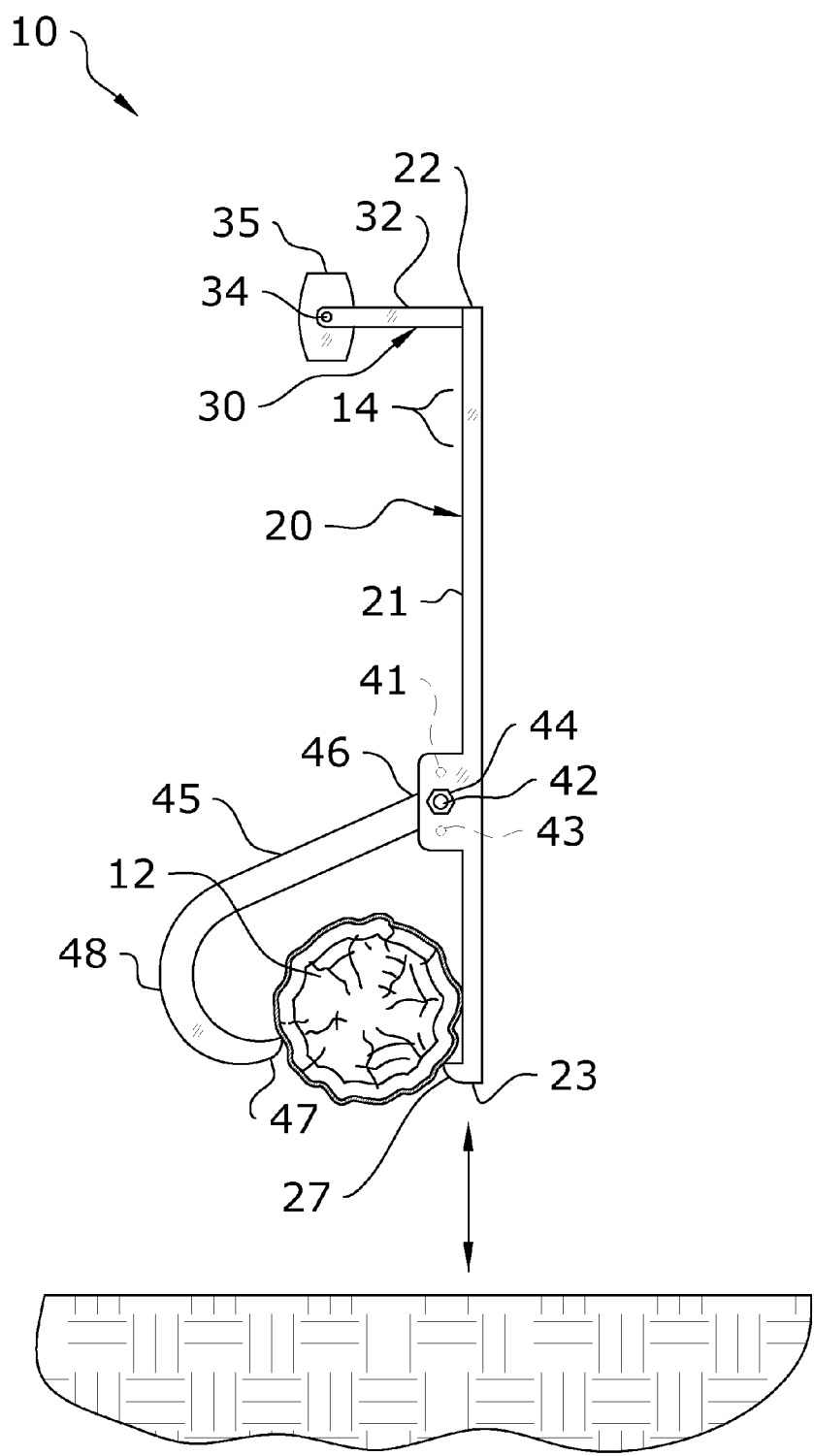
FIG. 9 is a side view of the present invention being utilized to lift a log.

In a preferred embodiment as shown in the figures, the handle 35 is vertically aligned with the curved portion 48 of the hook 45. By creating a cantilevered handle 35, a positive object 12 grab and lift efficiency of 100% is produced. Placing the handle 35 directly over the object 12 being lifted places the arm of the carrier directly over the center of gravity and thus correct ergonomics for carrying the picked object 12. The balance of the present invention and the object 12 being lifted is maintained in a perpendicular direction to the ground by the position and parallel to the carrier's body as a result of the cantilevered handle 35 as illustrated in FIG. 9.

In some embodiments, the handle 35 could be eliminated completely and a grip attached to the handle support 30 perpendicular to the body portion 21 of the grasping assembly 20. However, in this configuration the wrist of the user would be twisted and facing forward in the direction of the user's line of walk and would not be ergonomically correct, but still functional. In addition, the length of the object 12 being carried would not be facing the direction of the carrier's walk, but towards the person if the object 12 were to be carried in an ergonomically correct position with palm of the hand facing the carrier.

As best shown in FIG. 3, a hook 45 is pivotally secured adjacent the second end 23 of the body portion 21 of the grasping assembly 20. The hook 45 is utilized to aid in grasping, carrying, rolling, and releasing objects 12 such as logs as described herein. While the hook 45 may be pivotally secured directly to the body portion 21, in a preferred embodiment a hook support 40 is utilized as an interface between the body portion 21 and the hook 45.

The hook support 40 is fixedly secured to the body portion 21 and generally comprises a bracket structure which acts as a hinge to allow the hook 45 to pivot. The hook support 40 thus includes a pivot bolt 42 which extends through both the hook support 40 and the first end 46 of the hook 45 to pivotally secure the hook 45 within the hook support 40. A locking nut 44 may also be provided which may be selectively engaged over the pivot bolt 42 to lock the hook 45 in place and prevent motion to aid in carrying objects 12.

An upper stopper 41 may be positioned across the hook support 40 above the pivoted connection of the hook 45 and a lower stopper 43 may be positioned across the hook support 40 below the pivoted connection of the hook 45. The upper and lower stoppers 41, 43 act to inhibit full range of motion of the hook 45 and thus act to prevent injury or inefficiency during use. The lower stopper 43 also prevents the hook 45 from impacting the claw 27, which could cause damage to the claw 27 or the hook 45.

As best shown in FIG. 3, the hook 45 comprises a conventional hook configuration having a first end 46, a second end 47, and a curved portion 48. The first end 46 of the hook 45 is pivotally secured to the hook support 40 with the pivot bolt 42. The curved portion 48 may be engaged with the ground to aid in releasing an object 12 from within the hook 45 as described herein. The second end 47 of the hook 45 will swing both toward and away from the second end 23 of the body portion 21.

C. Cant Extension

Figure 4:
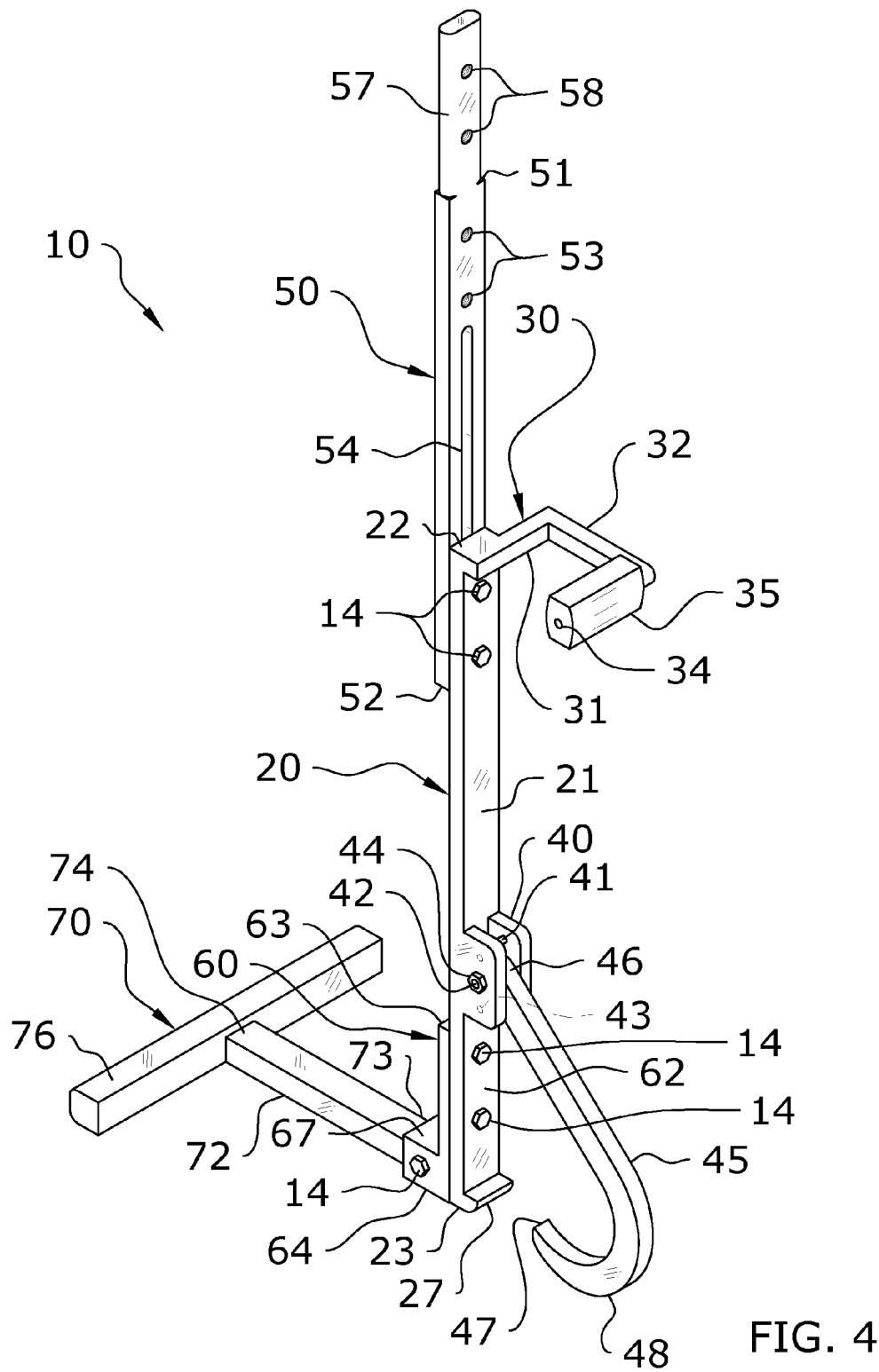
FIG. 4 is a frontal upper perspective view of the present invention with lifter and cant extensions attached.

As best shown in FIGS. 3-4, the present invention may include an optional cant extension 50 which may be removably secured to the first end 22 of the body portion 21 to convert the present invention into a cant hook configuration. This cant hook configuration may be utilized to roll an object 12 such as a longer log, such as one that requires cutting to stove length, where lifting and carrying the object 12 with the hook 45 may not be feasible. The log 12 is rolled over so that a cut can be completed without the chainsaw chain cutting into the ground, which will damage the chain.

As shown throughout the figures, the cant extension 50 comprises an elongated member having a first end 51 and a second end 52. A handle portion 57 will generally extend from the first end 51 of the cant extension 50. The handle portion 57 will generally be comprised of a smaller width than the cant extension 50 and may be comprised of an ergonomic configuration.

When installed, the cant extension 50 may act as an elongated handle which allows the present invention to be used as a conventional cant hook, except with the added utility of the handle 35 of the grasping assembly 20 to aid in rolling an object 12 such as is conventionally accomplished with a cant hook. A user will grasp the handle portion 57 of the cant extension 50 with one hand and the handle 35 of the grasping assembly 20 with the other hand. By using the handle portion 57 of the cant extension 50 in combination with the handle 35 of the grasping assembly 20, substantially better leverage and control may be obtained when rolling an object 12 such as a log.

The cant extension 50 is preferably adapted to be secured to the grasping assembly 20 in multiple positions. Thus, the cant extension 50 will generally include both upper apertures 53 and lower apertures 55 which may be selectively secured to the first body mounts 24 of the body portion 21 via one or more fasteners 14 to secure the cant extension 50 to the grasping assembly 20.

The upper apertures 53 may be utilized for a shorter cant extension 50 while the lower apertures 55 may be utilized for a longer cant extension 50. A central slot 54 may extend between the upper and lower apertures 53, 55 to provide for additional mounting options and to reduce the weight of the cant extension 50. Fasteners, washers, nuts, or the like could be utilized to provide variable positioning of the cant extension 50 via the central slot 54.

Figure 14:
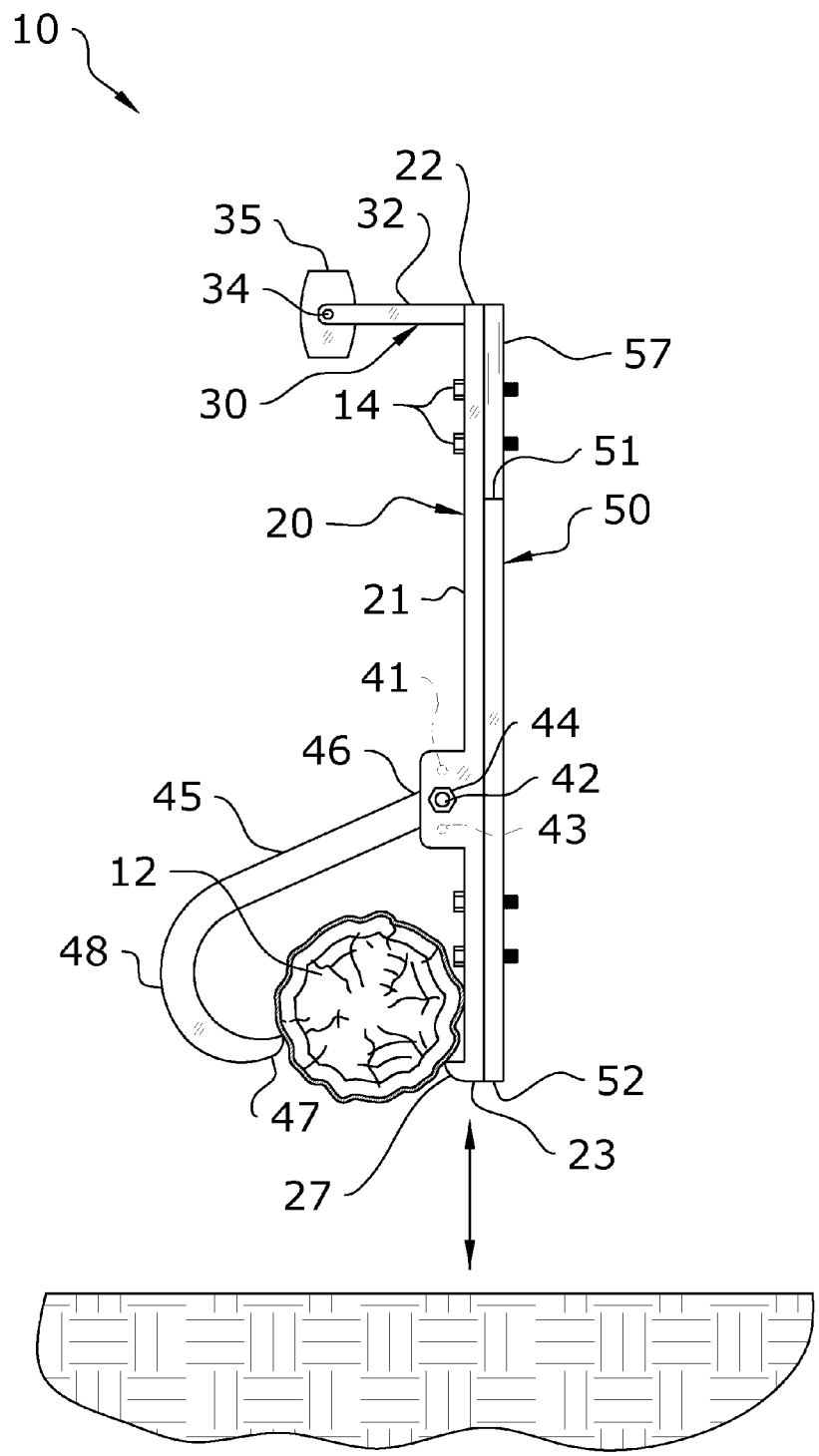
FIG. 14 is a side view of the present invention being utilized to lift a log with the cant extension handle in the stored position.

As best shown in FIG. 3, the handle portion 57 of the cant extension 50 may also include one or more handle apertures 58 in addition to the upper and lower apertures 53, 55. By aligning the lower apertures 55 of the cant handle 50 with the second body mounts 25 of the grasping assembly 20 and the handle apertures 58 of the handle portion 57 with the first body mounts 24 of the grasping assembly 20, the cant extension 50 may be stored on the grasping assembly 20, such as by using fasteners 14. When in such a stored position as shown in FIG. 14, both ends 51, 52 of the cant extension 50 are flush with the ends 22, 23 of the grasping assembly 20.

D. Lifter

In some embodiments of the present invention, a lifter adapter 60 may be secured to the grasping assembly 20 which supports a lifter extension 70 adapted to aid in lifting heavier or larger objects 12. Using the lifter extension 70, which is generally comprised of a T-bar shape, an object 12 which may be too large for use with the hook 45 may be lifted off the ground to be cut into smaller pieces for easier transport or use.

The lift adapter 60 and lifter extension 70 allow the present invention to be used as a conventional timber jack, except with the added utility of the handle 35 of the grasping assembly 20 to aid in lifting. The handle 35 in combination with the lifter extension 70 allows the user better leverage and control when lifting an object 12 to be cut. By using the lifter extension 70 to "jack up" the object 12, chances of the saw or other cutting tool hitting the ground and being damaged is reduced.

Figure 5:
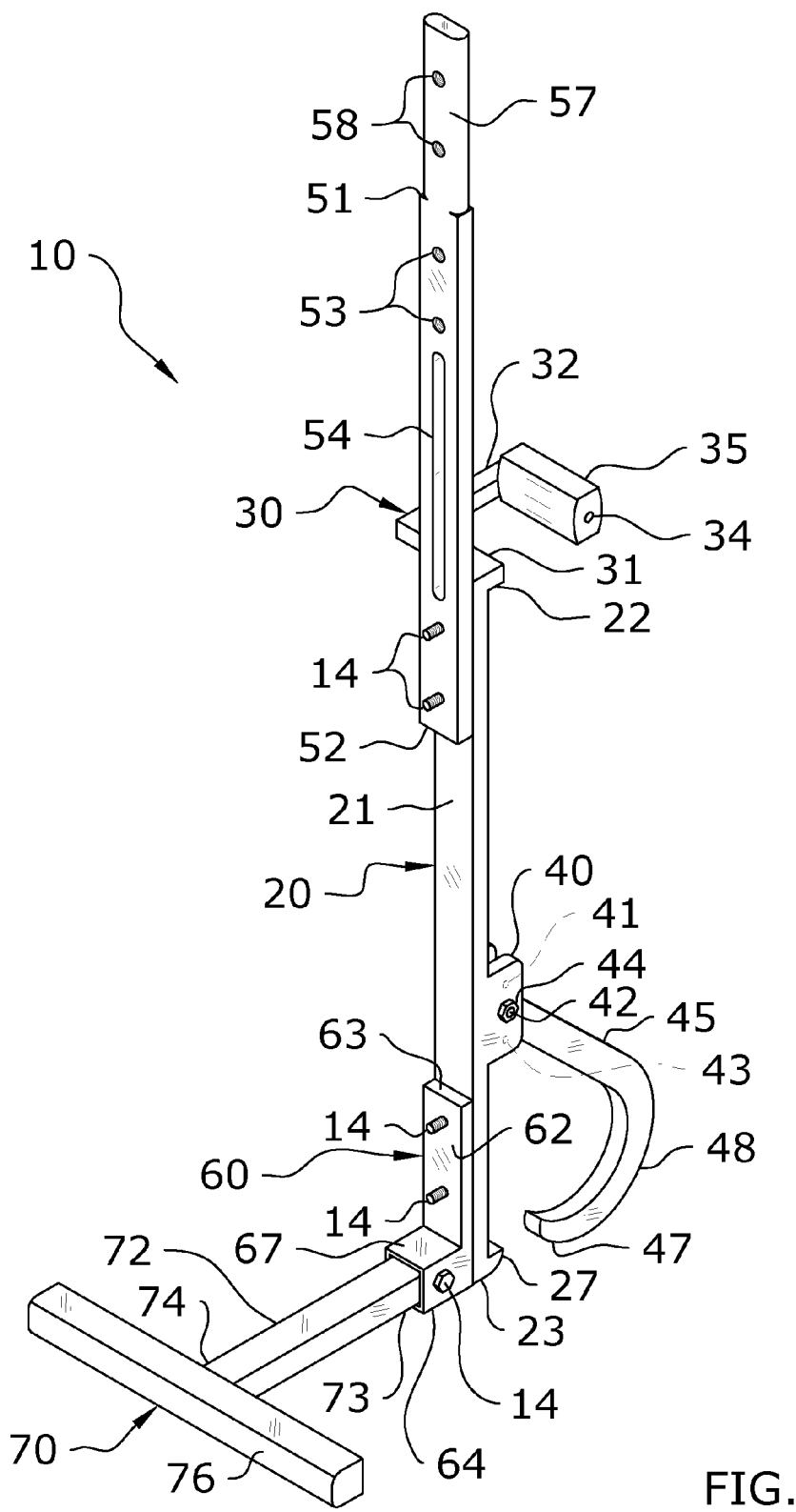
FIG. 5 is a rear upper perspective view of the present invention with lifter and cant extensions attached.
Figure 6:
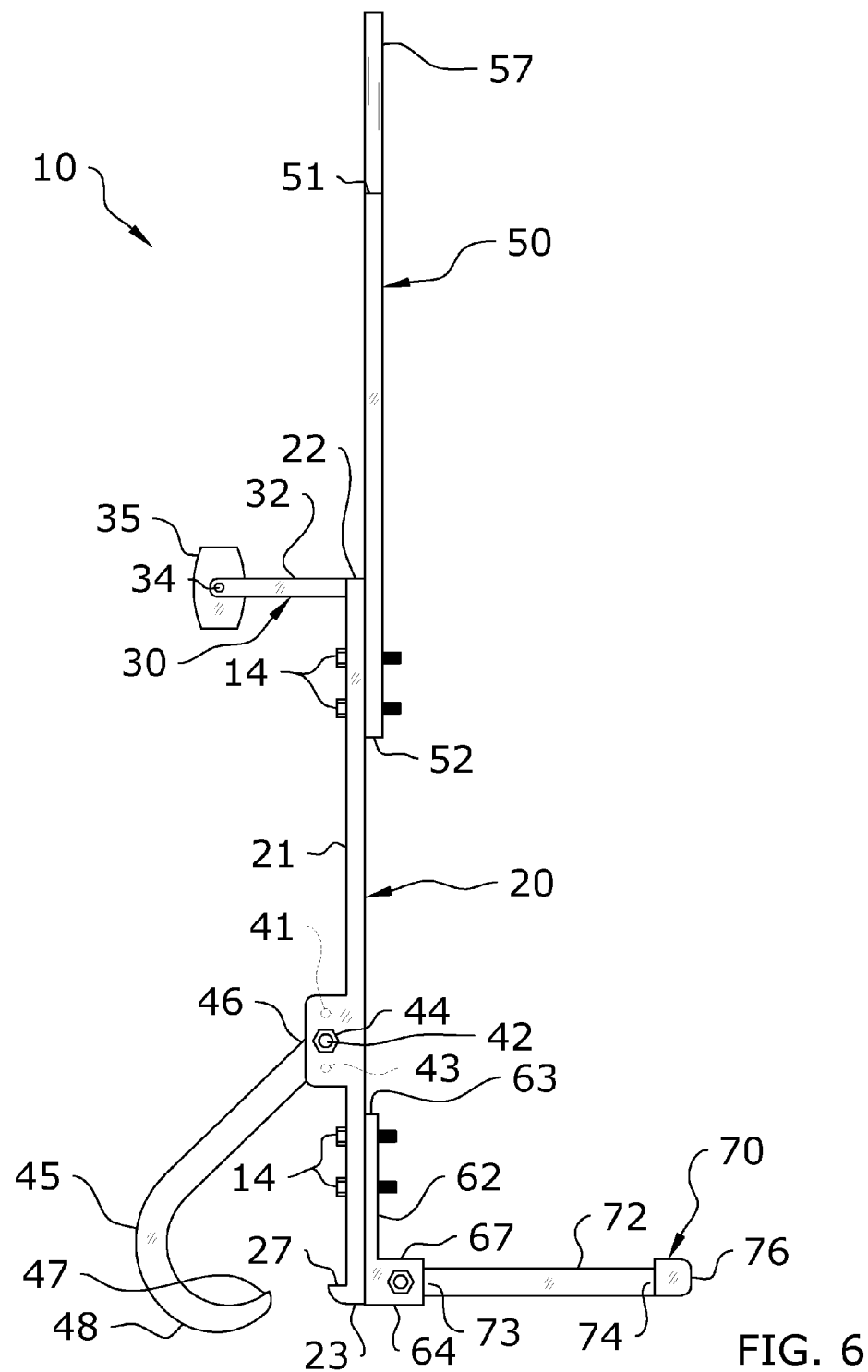
FIG. 6 is a side view of the present invention with lifter and cant extensions attached.
Figure 7:
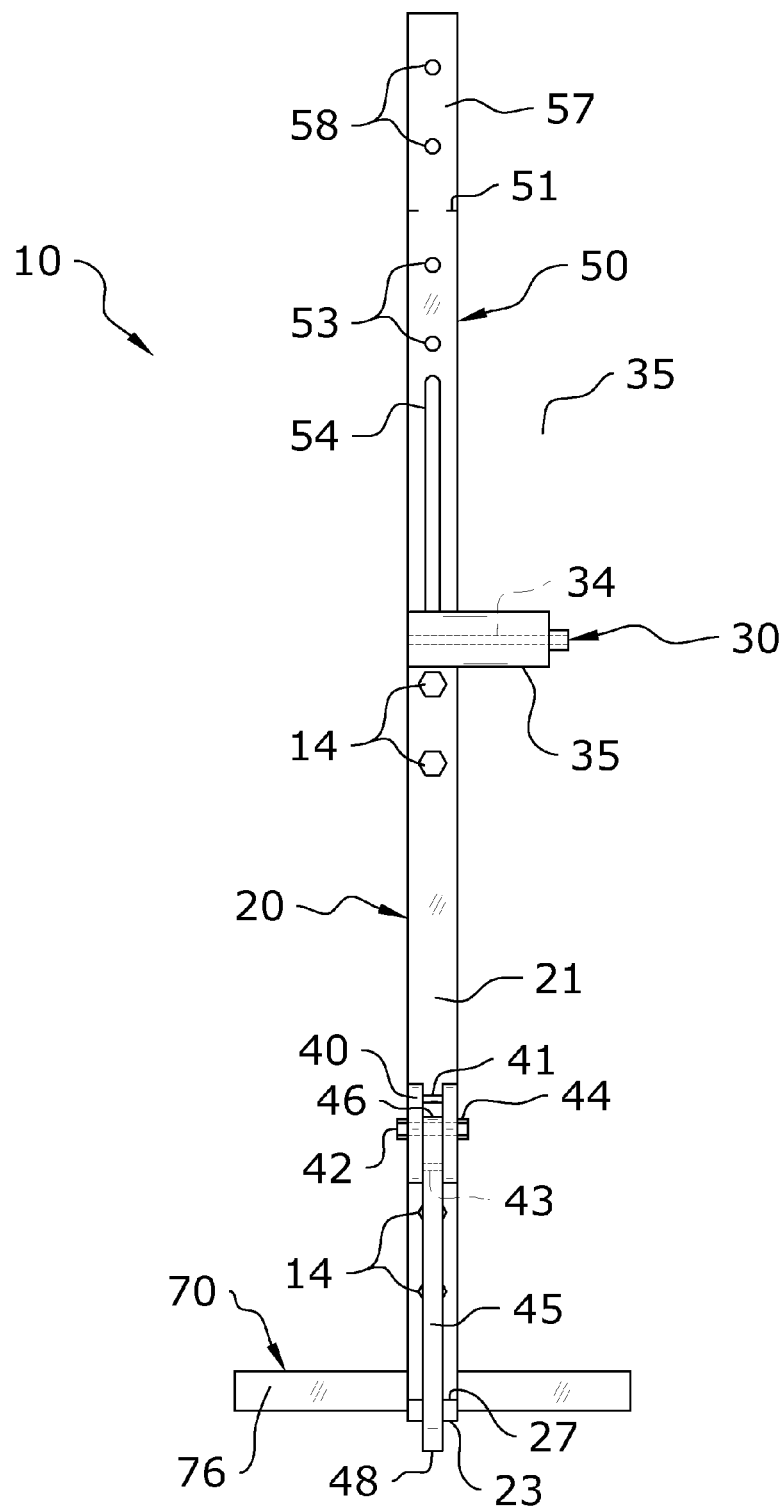
FIG. 7 is a frontal view of the present invention with lifter and cant extensions attached.
Figure 8:
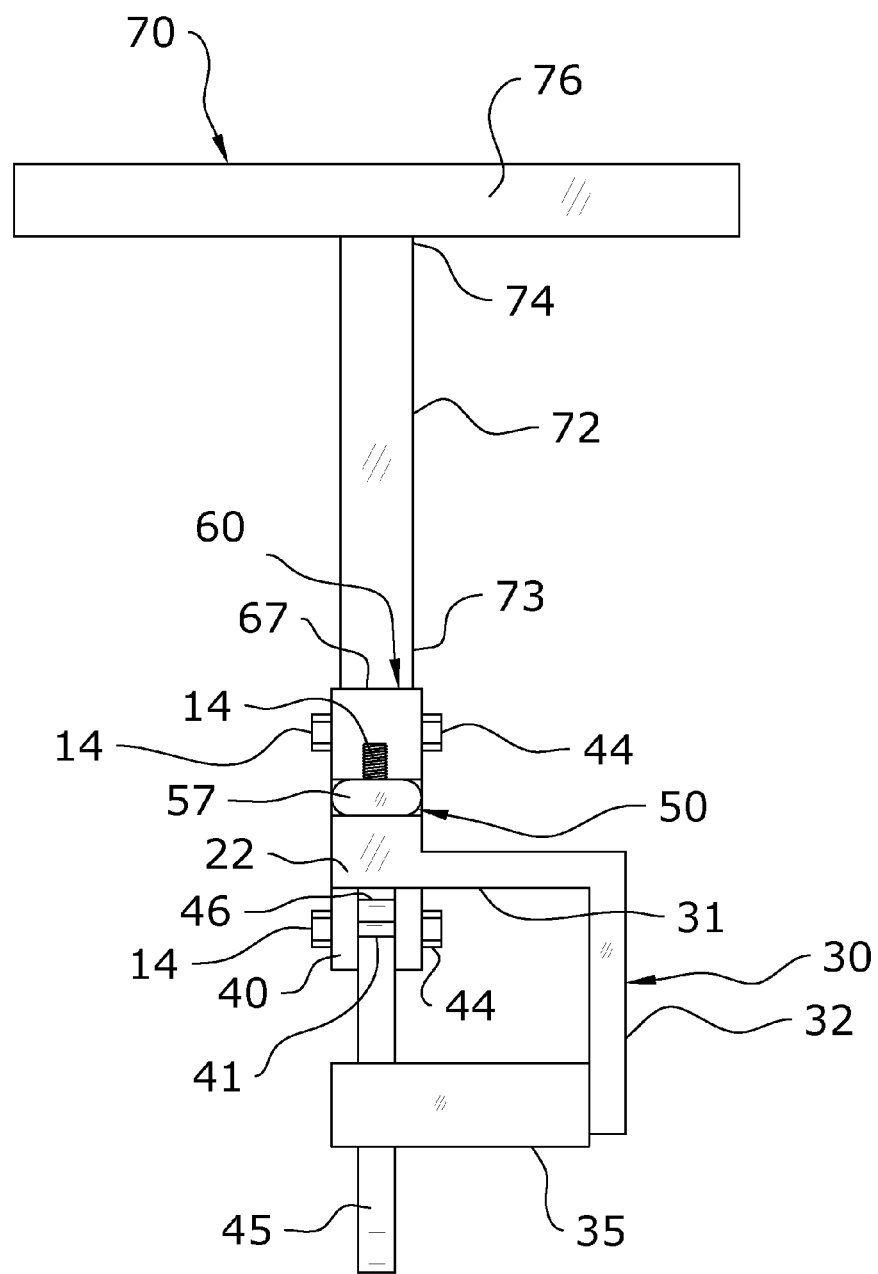
FIG. 8 is a top view of the present invention with lifter and cant extensions attached.

As shown in FIGS. 4-5, the lifter adapter 60 generally comprises a connecting structure which may be removably secured to the second end 23 of the body portion 21 of the grasping assembly 20 and to which the lifter extension 70 may be mounted. The lifter adapter 60 may be comprised of various shapes, sizes, and configurations, but will generally include a base portion 62 which is secured to the body portion 21 of the grasping assembly 20 and a receiver portion 67 which extends perpendicularly with respect to the base portion 62.

As best shown in FIG. 4, the base portion 62 of the lifter adapter 60 includes a first end 63 and a second end 64. The second end 64 of the base portion 62 will generally be flush with the second end 23 of the body portion 21 of the grasping assembly 20 when the lifter adapter 60 is mounted thereon.

One or more adapter mounts 65, generally comprised of apertures, may be included along the base portion 62 of the lifter adapter 60. Using fasteners 14 extending through both the adapter mounts 65 of the lifter adapter 60 and the second body mounts 25 of the grasping assembly 20, the lifter adapter 60 may be removably secured to the grasping assembly 20. Various other methods of attachment may also be utilized.

The receiver portion 67 extends from the second end 64 of the base portion 62 in a perpendicular direction as shown in the figures. The receiver portion 67 includes an opening 68 into which the first end 73 of the lifter extension 70 may be inserted and retained. The receiver portion 67 also includes a locking aperture 69 extending perpendicularly with respect to the opening 68. The locking aperture 69 receives a fastener 14 to secure the lifter extension 70 within the lifter adapter 60 as shown in the figures.

The lifter extension 70 generally comprises a T-bar configuration as shown in the figures to aid in lifting an object 12 such as shown in FIG. 5. The lifter extension 70 includes a first portion 72 having a first end 73 and a second end 74. The first end 73 of the lifter extension 70 is inserted within the receiver portion 67 of the lifter adapter 60 and may include an aperture through which a fastener 14 may be extended to secure the lifter extension 70 within the lifter adapter 60 as previously described. The second end 74 of the lifter extension 70 includes the perpendicularly and centered second portion 76 extending therefrom to form the T-configuration of the lifter extension 70 for aiding in lifting objects 12.

E. Operation of Preferred Embodiment

In use, the grasping assembly 20 may be utilized to lift and carry objects 12 such as logs that are not so large or heavy to prevent the hook 45 from properly retaining the object 12 against the claw 27. To do so, the grasping assembly 20 is held by the handle 35 and the hook 45 lowered onto object 12. As the assembly 20 is lowered over the object 12, the hook 45 pivots open to adjust to the diameter of the object 12 to be lifted. Upon lifting up with the handle 35, the hook 45 will pivot to engage around the object 12 and retain it against the claw 27 as shown in FIG. 9. The object 12 may then be carried with the grasping assembly 20. Upon reaching the destination, the object 12 may be released by rolling the curved portion 48 of the hook 45 to allow the hook 45 to swing out and release the object 12. Various other methods for releasing the object 12 may be utilized.

The cant extension 50 may be installed to convert the present invention into a cant hook configuration. The cant extension 50 is first secured to the first end 22 of the body portion 21 of the grasping assembly 20. The cant extension 50 may be secured to the grasping assembly 20 to have different functional lengths by selecting either the upper or lower apertures 53, 55 to be mounted to the first body mounts 24 of the body portion 21 with fasteners 14. Selecting the lower apertures 55 will allow for a longer cant hook configuration, whereas selecting the upper apertures 53 will allow for a shorter cant hook configuration. The longer the configuration, the greater the leverage one will have to roll the object 12. The position is selected based on the size of the object 12 to be rolled.

After securing the cant extension 50 to the grasping assembly 20, the present invention may be utilized as a conventional cant hook, except with the added benefit of the handle 35 of the grasping assembly 20. The handle portion 57 of the cant extension 50 may be grasped by the user with one hand while the handle 35 of the grasping assembly 20 may be grasped by the user with the other hand. The hook 45 is positioned over and around the object 12 until the object 12 is retained within the hook 45. The handles 35, 57 may then be pulled towards the body to roll the object 12 to a different location (such as a better location for cutting).

Figure 10:
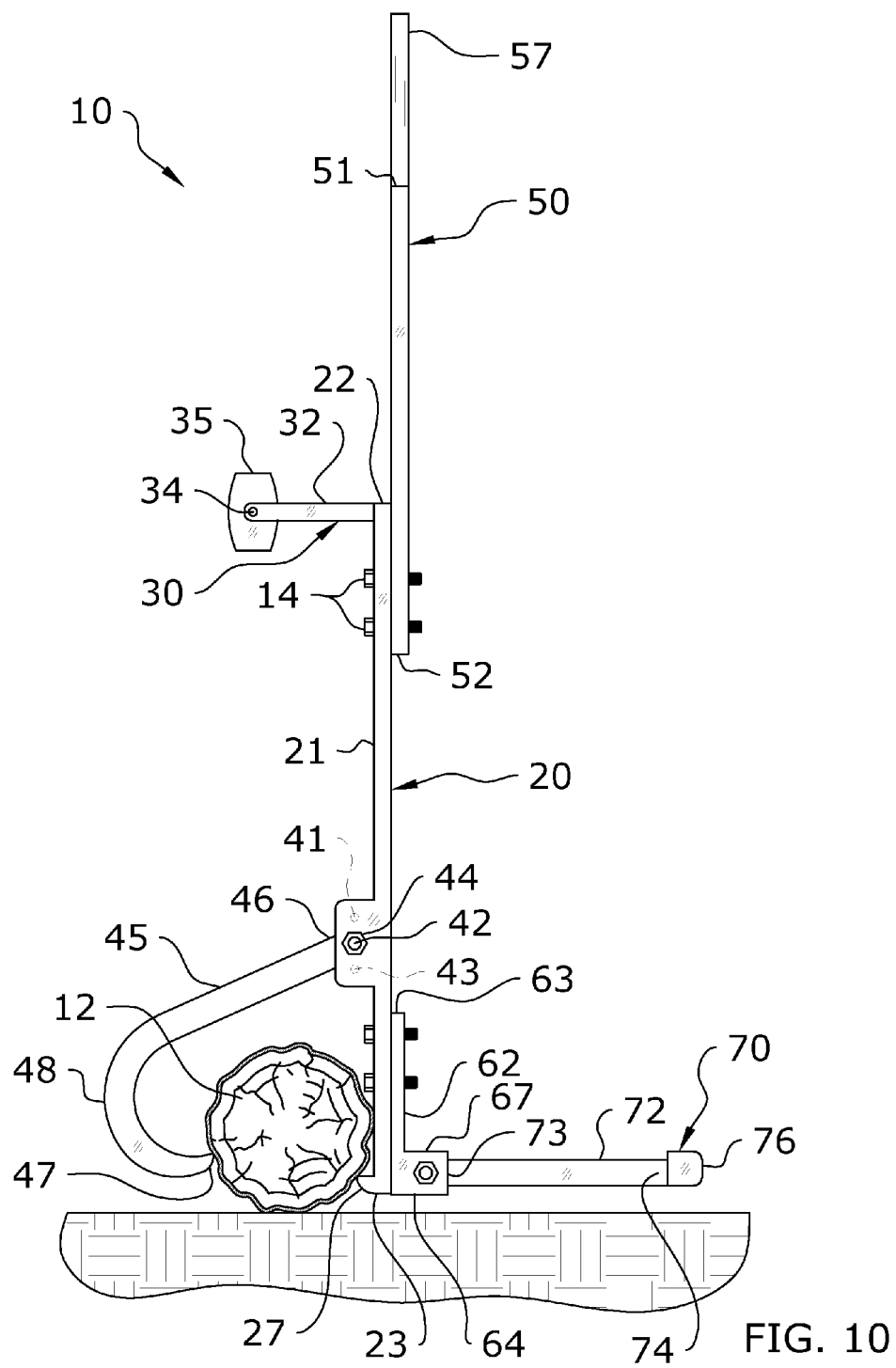
FIG. 10 is a side view of the present invention with a log being positioned to be lifted via the lifter attachment.
Figure 11:
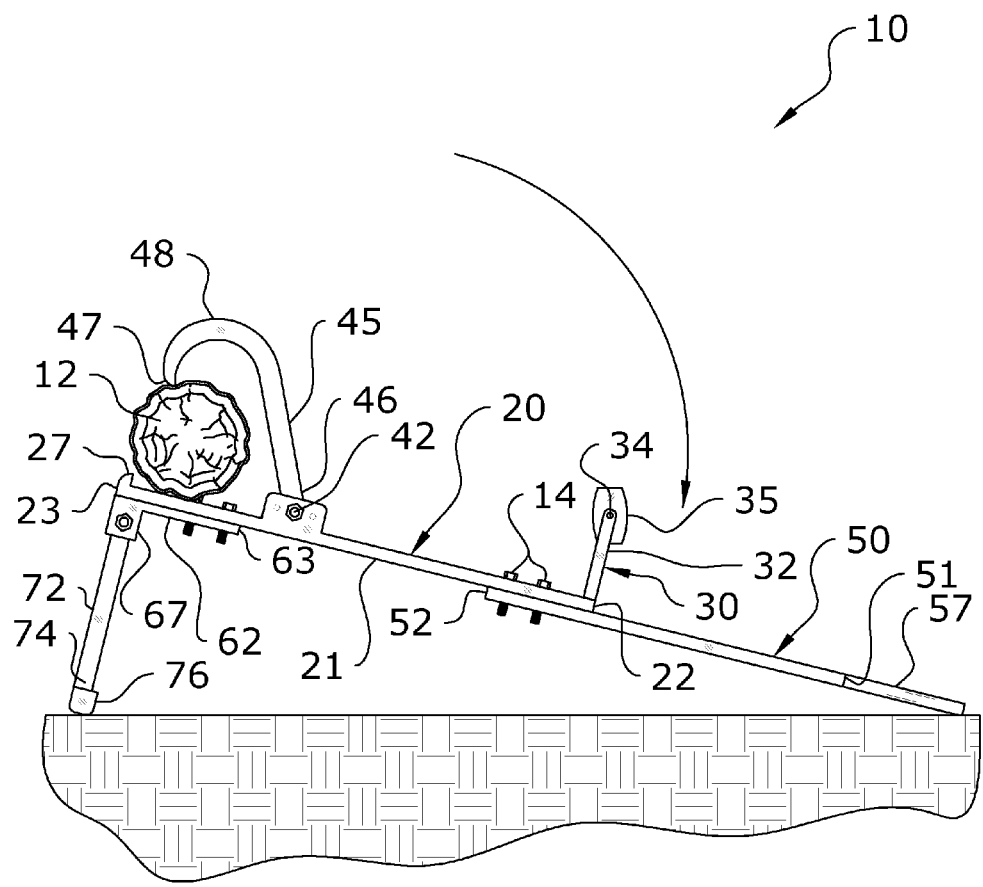
FIG. 11 is a side view of the present invention retaining a log in a lifted position via the lifter attachment.
Figure 12:
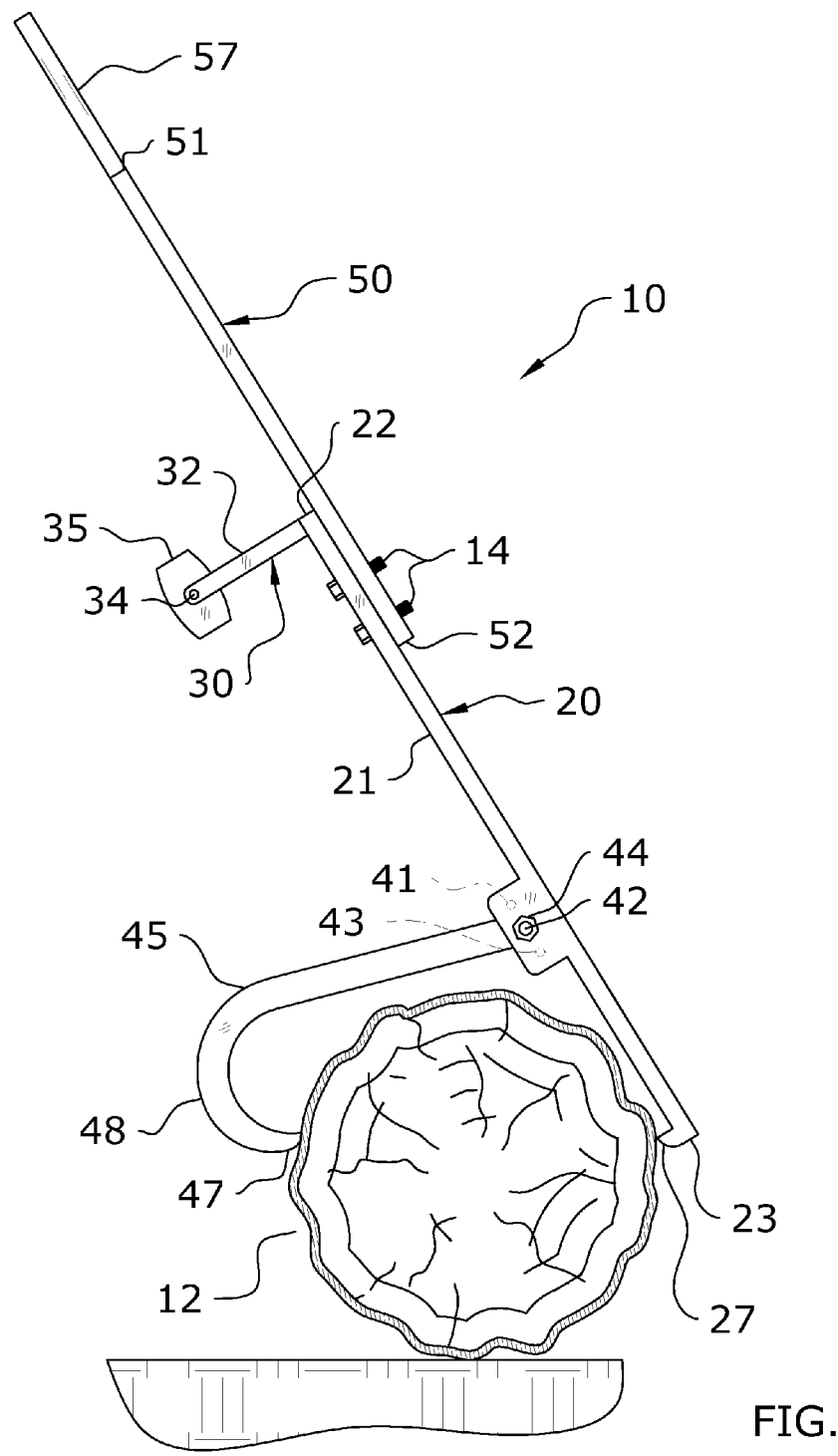
FIG. 12 is a side view of the present invention positioned over a log prior to rolling the log via the cant extension.
Figure 13:
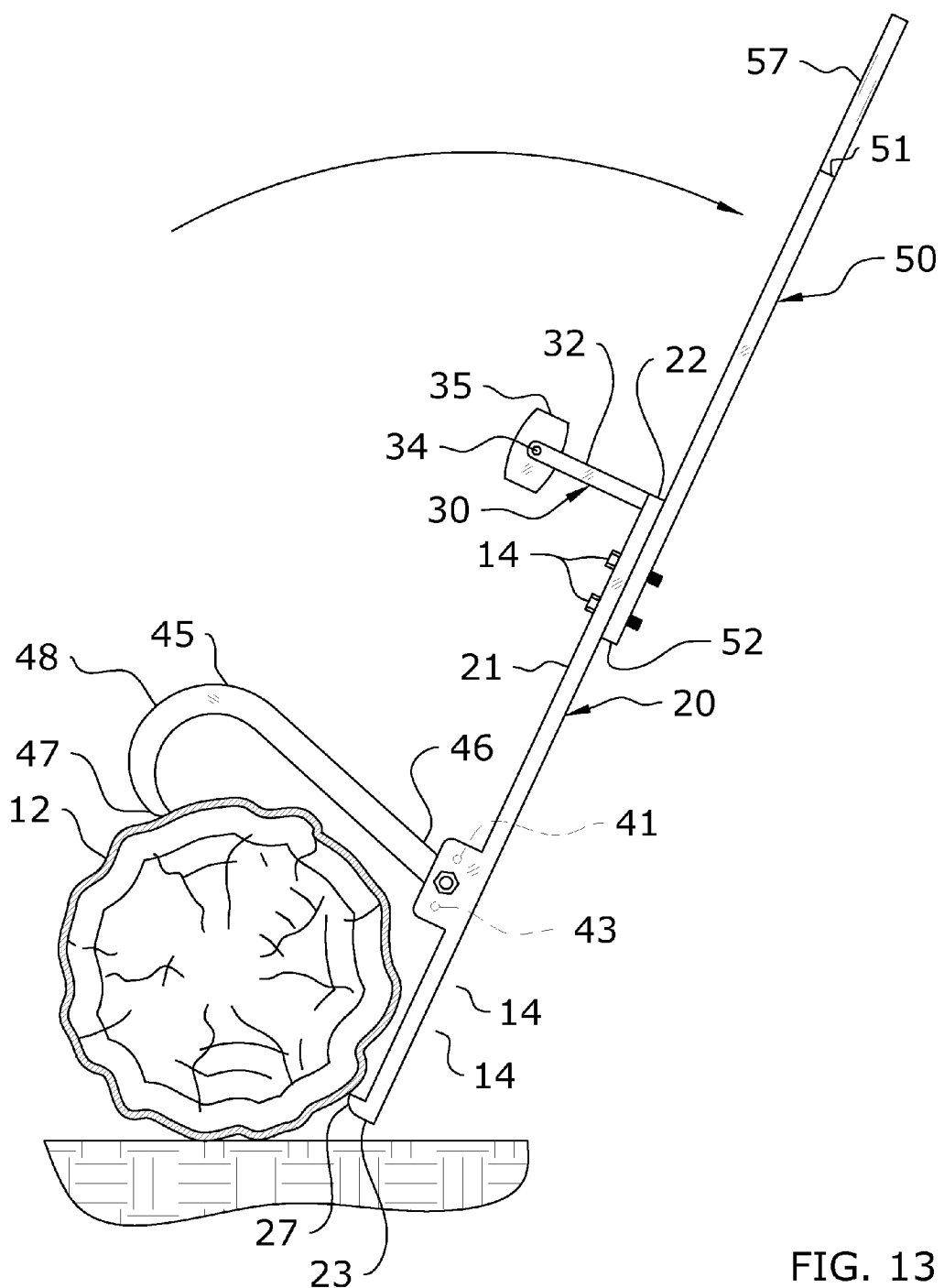
FIG. 13 is a side view of the present invention rolling a log via the cant extension.

A lifter extension 70 may be utilized to "jack up" the object 12, such as for cutting. This process is best shown in FIGS. 10 and 11. First, the lifter adapter 60 is secured to the second end 23 of the body portion 21 of the grasping assembly 20. Fasteners 14 may be utilized to secure through the adapter mounts 65 of the lifter adapter 60 and the second body mounts 25 of the body portion 21 of the grasping assembly 20. With the lifter adapter 60 secured to the grasping assembly 20, the lifter extension 70 may be inserted within the receiver portion 67 of the lifter adapter 60 and secured with fasteners 14.

With the lifter extension 70 properly installed, the hook 45 is positioned over and around the object 12, with the cant extension 50 in a substantially vertical position. The handle portion 57 of the cant extension 50 may be grasped with one hand, while the handle 35 of the grasping assembly 20 may be grasped with the other hand. Both handles 35, 57 may then be pulled in the direction of the lifter extension 70 until the handle portion 57 of the cant extension 50 rests on the ground, with the object 12 in a lifted position due to the lifter extension 70 as shown in FIG. 11. The object 12 may then be cut to size without risk of the cutting tool (such as a saw) hitting the ground.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An object transporting system, comprising:
   a grasping assembly, wherein said grasping assembly comprises a body portion;
   a handle extending from a first end of said body portion;
   a hook pivotally secured adjacent a second end of said body portion;
   a hook support adjacent to said second end of said body portion, wherein said hook support includes a pivot pin, wherein said hook is pivotally secured to said hook support by said pivot pin; and
   an upper stopper extending across said hook support above said pivot pin and a lower stopper extending across said hook support below said pivot pin.

2. The object transporting system of claim 1, further comprising a handle support extending from said first end of said body portion, wherein said handle is secured to said handle support.

3. The object transporting system of claim 2, wherein said handle is vertically aligned with said hook.

4. The object transporting system of claim 1, further comprising a claw positioned at said second end of said body portion.

5. The object transporting system of claim 1, further comprising a cant extension adapted to be removably secured to said grasping assembly.

6. The object transporting system of claim 5, wherein said body portion includes one or more first body mounts adapted to removably mount said cant extension to said body portion.

7. The object transporting system of claim 6, wherein said one or more first body mounts comprise one or more apertures extending through said first end of said body portion.

8. The object transporting system of claim 7, wherein said cant extension includes one or more upper apertures and one or more lower apertures, said one or more upper apertures being adapted to secure said cant extension to said body portion in a first position and said one or more lower apertures being adapted to secure said cant extension to said body portion in a second position.

9. The object transporting system of claim 5, wherein said cant extension comprises an elongated member having a handle portion extending therefrom.

10. The object transporting system of claim 9, wherein said cant extension includes a central slot.

11. The object transporting system of claim 1, further comprising a lifter adapter for removably securing to said second end of said body portion.

12. The object transporting system of claim 11, wherein said lifter adapter comprises a base portion and a receiver portion extending from said base portion.

13. The object transporting system of claim 12, wherein said receiver portion includes an opening adapted to removably receive a lifter extension.

14. The object transporting system of claim 13, wherein said lifter adapter includes one or more adapter mounts, said one or more adapter mounts being adapted to align with and be secured to one or more second body mounts positioned adjacent to said second end of said body portion.

15. The object transporting system of claim 13, wherein said lifter extension is comprised of a T-bar.

16. An object transporting system, comprising:
a grasping assembly, wherein said grasping assembly comprises a body portion;
a handle support extending from a first end of said body portion, wherein said handle support comprises a first portion extending perpendicularly from said body portion and a second portion extending perpendicularly with respect to said first portion;
a handle secured to said second portion of said handle support, wherein said handle extends in parallel relationship with said first portion of said handle support, wherein said handle is offset along a horizontal plane with respect to said body portion;
a hook support adjacent to a second end of said body portion, wherein said hook support includes a pivot pin;
a hook pivotally secured to said hook support by said pivot pin, wherein said handle is vertically aligned with said hook;
an upper stopper extending across said hook support above said pivot pin;
a lower stopper extending across said hook support below said pivot pin;
a claw positioned at said second end of said body portion;
a cant extension adapted to be removably secured to said grasping assembly, wherein said body portion includes one or more first body mounts adapted to removably mount said cant extension to said body portion, wherein said one or more first body mounts comprise one or more apertures extending through said first end of said body portion;
wherein said cant extension includes one or more upper apertures and one or more lower apertures, said one or more upper apertures being adapted to secure said cant extension to said body portion in a first position and said one or more lower apertures being adapted to secure said cant extension to said body portion in a second position, wherein said cant extension comprises an elongated member having a handle portion extending therefrom, wherein said cant extension includes a central slot; and
a lifter adapter for removably securing to said second end of said body portion, wherein said lifter adapter comprises a base portion and a receiver portion extending from said base portion, wherein said receiver portion includes an opening adapted to removably receive a lifter extension, wherein said lifter extension is comprised of a T-bar, wherein said lifter adapter includes one or more adapter mounts, said one or more adapter mounts being adapted to align with and be secured to one or more second body mounts positioned adjacent to said second end of said body portion.

* * * * *